United States Patent
Takahashi et al.

(10) Patent No.: US 9,609,657 B2
(45) Date of Patent: Mar. 28, 2017

(54) MOBILE COMMUNICATION METHOD, RADIO BASE STATION AND MOBILE STATION

(71) Applicant: NTT DOCOMO, INC., Tokyo (JP)

(72) Inventors: Hideaki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 11 days.

(21) Appl. No.: 14/375,221

(22) PCT Filed: Jan. 30, 2013

(86) PCT No.: PCT/JP2013/052030
§ 371 (c)(1),
(2) Date: Jul. 29, 2014

(87) PCT Pub. No.: WO2013/115243
PCT Pub. Date: Aug. 8, 2013

(65) Prior Publication Data
US 2014/0369295 A1    Dec. 18, 2014

(30) Foreign Application Priority Data

Jan. 30, 2012 (JP) .................................. 2012-017376

(51) Int. Cl.
| | | |
|---|---|---|
| *H04W 72/08* | (2009.01) | |
| *H04W 52/36* | (2009.01) | |
| *H04W 52/54* | (2009.01) | |
| *H04L 5/00* | (2006.01) | |
| *H04W 52/02* | (2009.01) | |
| *H04W 72/12* | (2009.01) | |
| *H04W 52/16* | (2009.01) | |
| *H04W 52/32* | (2009.01) | |

(52) U.S. Cl.
CPC ......... *H04W 72/082* (2013.01); *H04L 5/0048* (2013.01); *H04L 5/0073* (2013.01);
(Continued)

(58) Field of Classification Search
CPC ... H04L 5/0044; H04L 5/0048; H04L 5/0073; H04W 52/0229; H04W 72/082; H04W 72/1289
(Continued)

(56) References Cited

U.S. PATENT DOCUMENTS

| | | | | |
|---|---|---|---|---|
| 9,331,832 B2* | 5/2016 | Lindbom | ................ | H04L 5/005 |
| 2011/0199985 A1* | 8/2011 | Cai | ....................... | H04L 1/0026 370/329 |

(Continued)

FOREIGN PATENT DOCUMENTS

JP    5837833 B2    12/2015

OTHER PUBLICATIONS

International Search Report issued in PCT/JP2013/052030 mailed on Feb. 26, 2013 (2 pages).
(Continued)

*Primary Examiner* — Mohammad Anwar
*Assistant Examiner* — Kokou R Detse
(74) *Attorney, Agent, or Firm* — Osha Liang LLP

(57) ABSTRACT

An objective of the present invention is to perform an appropriate demodulation process on a received signal in ABS. A mobile communication method according to the present invention includes the steps of: notifying a mobile station UE of an ABS "P_B" initial value by a radio base station eNB using an SIB2; notifying the mobile station UE of an ABS "P_A" initial value by the radio base station eNB using "RRCConnectionReconfiguration"; and performing a demodulation process on a downlink data signal in ABS by the mobile station UE on the basis of the ABS "P_B" initial value and the ABS "P_A" initial value.

3 Claims, 10 Drawing Sheets

(52) U.S. Cl.
CPC .......... *H04W 52/36* (2013.01); *H04W 52/54* (2013.01); *H04L 5/0044* (2013.01); *H04W 52/0229* (2013.01); *H04W 52/16* (2013.01); *H04W 52/325* (2013.01); *H04W 72/1289* (2013.01)

(58) Field of Classification Search
USPC ........................................................ 370/329
See application file for complete search history.

(56) References Cited

U.S. PATENT DOCUMENTS

| | | | |
|---|---|---|---|
| 2013/0114517 A1* | 5/2013 | Blankenship | H04L 5/0053 370/329 |
| 2013/0215857 A1* | 8/2013 | Wu | H04W 52/143 370/329 |
| 2014/0369295 A1 | 12/2014 | Takahashi et al. | |

OTHER PUBLICATIONS

LG Electronics; "Specification impact of reduced power ABS"; 3GPP TSG RAN WG1 Meeting #67, R1-113978; San Francisco, USA; Nov. 14-18, 2011 (3 pages).

Ericsson, ST-Ericsson; "On air interface changes for FeICIC"; 3GPP TSG-RAN WG1 #67, R1-114299; San Francisco, USA; Nov. 14-18, 2011 (2 pages).

Extended European Search Report issued in the counterpart European Patent Application No. 13743021.1, mailed Sep. 9, 2015 (4 pages).

Office Action issued Aug. 16, 2016, in corresponding Japanese Patent Application No. 2015-222057 (with translation) (4 pages).

\* cited by examiner

FIG. 4
*PDSCH-Config* information element

```
-- ASN1START

PDSCH-ConfigCommon ::=      SEQUENCE {
    referenceSignalPower        INTEGER     (-60..50),
    p-b                         INTEGER     (0..3)
}

PDSCH-ConfigDedicated::=    SEQUENCE    {
    p-a                             ENUMERATED  {
                                        dB-6,   dB-4dot77,  dB-3,   dB-1dot77,
                                        dB0,    dB1,    dB2,    dB3}
}

PDSCH-ConfigCommon ::=      SEQUENCE {
    referenceSignalPower        INTEGER     (-60..50),
    p-b                         INTEGER     (0..3)
    p-b-ABS    [p-b FOR ABS]    INTEGER     (offset VALUE FROM OFDM symbol IN WHICH p-a-ABS IS
APPLIED),
    ABSPatternPCell-r11         ABSPatternPCell-r11
}

PDSCH-ConfigDedicated-r11 ::=   SEQUENCE {
    p-a                             ENUMERATED  {
                                        dB-6,   dB-4dot77,  dB-3,   dB-1dot77,
                                        dB0,    dB1,    dB2,    dB3},
    p-a-ABS    [p-a FOR ABS]        ENUMERATED { POWER offset VALUE FROM CRS FOR ABS},
    ABSPatternPCell-r11             ABSPatternPCell-r11
}
-- ASN1START

-- ASN1STOP
```

| PDSCH-Config field descriptions |
| --- |
| *p-a* |
| Parameter: $P_A$, see TS 36.213 [23, 5.2]. Value dB-6 corresponds to -6 dB, dB-4dot77 corresponds to -4.77 dB etc. |
| *p-b* |
| Parameter: $P_B$, see TS 36.213 [23, Table 5.2-1]. |
| *referenceSignalPower* |
| Parameter: *Reference-signal power*, which provides the downlink reference-signal EPRE, see TS 36.213 [23, 5.2]. The actual value in dBm. |

FIG. 5

ABSPattern information element

```
-- ASN1START

ABSPattern-r11 ::= CHOICE {
    ABSPatternFDD-r11              BIT   STRING (SIZE (40)),
    ABSPatternTDD-r11              CHOICE {
        subframeConfig1-5-r11                BIT   STRING (SIZE (20)),
        subframeConfig0-r11                  BIT   STRING (SIZE (70)),
        subframeConfig6-r11                  BIT   STRING (SIZE (60)),
        ...
    },
    ...
}

-- ASN1STOP
```

MOBILE COMMUNICATION METHOD, RADIO BASE STATION AND MOBILE STATION

TECHNICAL FIELD

The present invention relates to a mobile communication method, a radio base station and a mobile station.

BACKGROUND ART

In LTE, "eICIC (Enhanced Inter-Cell Interference Coordination)" has been studied in which in ABS (Almost Blank Subframe), a radio base station eNB reduces transmission power on a PDSCH (Physical Downlink Shared Channel) for a mobile station UE in an "RRC Connected state" in a macrocell to a level not interfering with a mobile station UE in an "RRC Connected state" in a picocell, as shown in FIG. 11(a).

However, when 16 QAM or 64 QAM is applied, the mobile station UE estimates the amplitude of a received signal based on an offset value between transmission power of a signaled CRS (Cell-specific Reference Signal) and the transmission power on the PDSCH. This leads to a problem that an appropriate demodulation process on a received signal cannot be performed when the transmission power on the PDSCH is reduced only in ABS.

In order to solve the above problem, it has been proposed that the radio base station eNB signals the offset value in ABS via an upper layer to the mobile station UE as shown in FIG. 11(b) (see, e.g., Non-patent documents 1 and 2).

PRIOR ART DOCUMENT

Non-Patent Document

Non-patent document 1: 3GPP contributed article R1-114299
Non-patent document 2: 3GPP contributed article R1-113978

SUMMARY OF THE INVENTION

However, the above proposal discloses no detailed specifications such as what kind of value should be signaled in what timing using what protocol exactly.

Therefore, the above proposal has a problem that the mobile station UE cannot actually perform an appropriate demodulation process on a received signal in ABS.

The present invention has been made in view of the above-mentioned problem. An objective of the present invention is to provide a mobile communication method, a radio base station and a mobile station, capable of performing an appropriate demodulation process on a received signal in ABS.

A first feature of the present invention is summarized as a mobile communication method including the steps of: notifying a mobile station of an initial value of a first offset value for ABS by a radio base station using notification; notifying the mobile station of an initial value of a second offset value for ABS by the radio base station through RRC signaling; and performing a demodulation process on a downlink data signal in ABS by the mobile station based on the initial value of the first offset value for ABS and the initial value of the second offset value for ABS, in which the first offset value for ABS is a value representing a ratio between transmission power on a physical downlink shared channel in a period in which a cell-specific reference signal is transmitted in ABS, and transmission power on the physical downlink shared channel in a period in which no cell-specific reference signal is transmitted in ABS, and the second offset value for ABS is a value representing a ratio between the transmission power on the physical downlink shared channel in the period in which no cell-specific reference signal is transmitted in ABS and transmission power of the cell-specific reference signal.

A second feature of the present invention is summarized as a radio base station including: a transmission unit configured to notify a mobile station of an initial value of a first offset value for ABS by using notification, and to notify the mobile station of an initial value of a second offset value for ABS through RRC signaling, in which the first offset value for ABS is a value representing a ratio between transmission power on a physical downlink shared channel in a period in which a cell-specific reference signal is transmitted in ABS and transmission power on the physical downlink shared channel in a period in which no cell-specific reference signal is transmitted in ABS, and the second offset value for ABS is a value representing a ratio between the transmission power on the physical downlink shared channel in the period in which no cell-specific reference signal is transmitted in ABS and transmission power of the cell-specific reference signal.

A third feature of the present invention is summarized as a mobile station including: an offset value acquisition unit configured to acquire an initial value of a first offset value for ABS by using notification, and to acquire an initial value of a second offset value for ABS through RRC signaling from a radio base station; and a downlink data signal receiving unit configured to perform a demodulation process on a downlink data signal in ABS based on the initial value of the first offset value for ABS and the initial value of the second offset value for ABS, in which the first offset value for ABS is a value representing a ratio between transmission power on a physical downlink shared channel in a period in which a cell-specific reference signal is transmitted in ABS and transmission power on the physical downlink shared channel in a period in which no cell-specific reference signal is transmitted in ABS, and the second offset value for ABS is a value representing a ratio between the transmission power on the physical downlink shared channel in the period in which no cell-specific reference signal is transmitted in ABS and transmission power of the cell-specific reference signal.

BRIEF DESCRIPTION OF THE DRAWINGS

FIG. 4 is a diagram showing an example of "PDSCH-Config" used in the mobile communication system according to the first embodiment of the present invention.

FIG. 5 is a diagram showing an example of "ABSPattern" in "PDSCH-Config" used in the mobile communication system according to the first embodiment of the present invention.

DETAILED DESCRIPTION (Mobile Communication System According to First Embodiment of the Invention)

Figure 1:
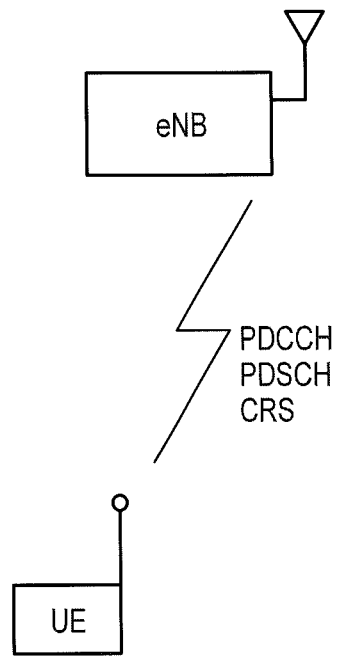
FIG. 1 is an overall configuration diagram of a mobile communication system according to a first embodiment of the present invention.
Figure 7:
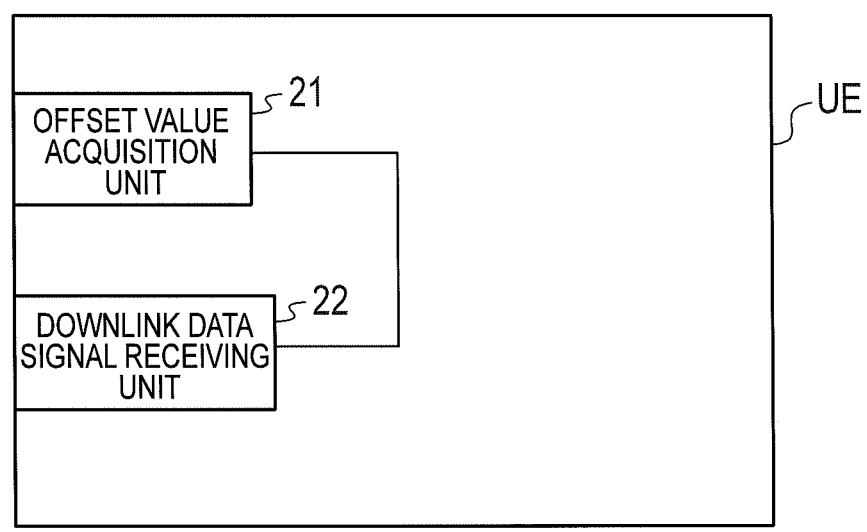
FIG. 7 is a functional block diagram of a mobile station according to the first embodiment of the present invention.

With reference to FIGS. 1 and 7, a mobile communication system according to a first embodiment of the present invention will be described.

The mobile communication system according to this embodiment supports LTE-Advanced, and is configured to support eICIC.

In the mobile communication system according to this embodiment, as shown in FIG. 1, a radio base station eNB is configured to transmit a downlink control signal through a PDCCH (Physical Downlink Control Channel) and a downlink data signal through a PDSCH to a mobile station UE.

Also, in the mobile communication system according to this embodiment, the radio base station eNB is configured to transmit a cell-specific CRS in a cell under the control thereof.

Here, the radio base station eNB is also configured to transmit a downlink data signal, a downlink control signal and a CRS in ABS. Note that transmission power of the downlink data signal and downlink control signal in ABS is set to be lower than that of the downlink data signal and downlink control signal in a subframe other than the ABS.

Note that transmission power of the CRS in the ABS is set to be equal to one in the subframe other than the ABS.

Figure 2:
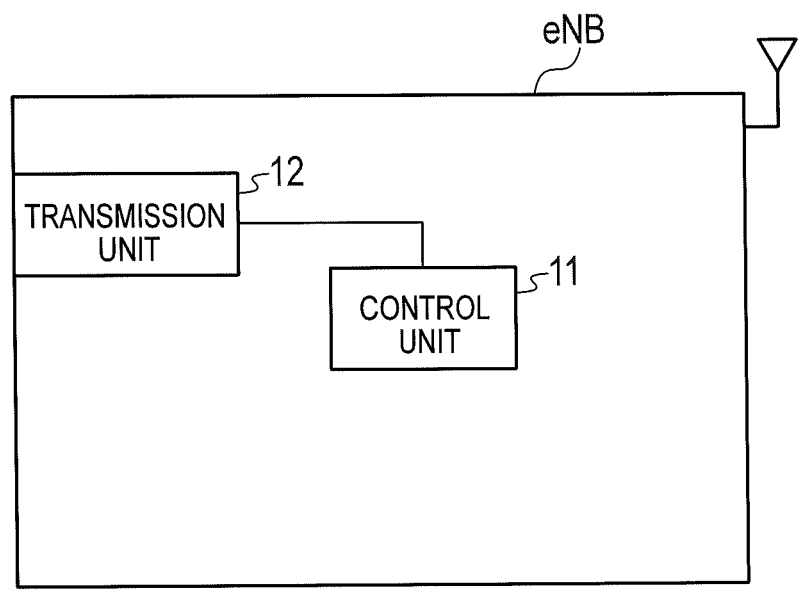
FIG. 2 is a functional block diagram of a radio base station according to the first embodiment of the present invention.

As shown in FIG. 2, the radio base station eNB according to this embodiment includes a control unit 11 and a transmission unit 12.

The control unit 11 is configured to perform various controls in the radio base station eNB. For example, the control unit 11 is configured to determine an ABS pattern, to determine the transmission power of the CRS and to determine the transmission power on the PDSCH.

Also, the control unit 11 is configured to calculate an ABS "P_A" initial value, an ABS "P_B" initial value, difference information from the ABS "P_B" initial value, difference information from the ABS "P_A" initial value, and the like.

Figure 3:
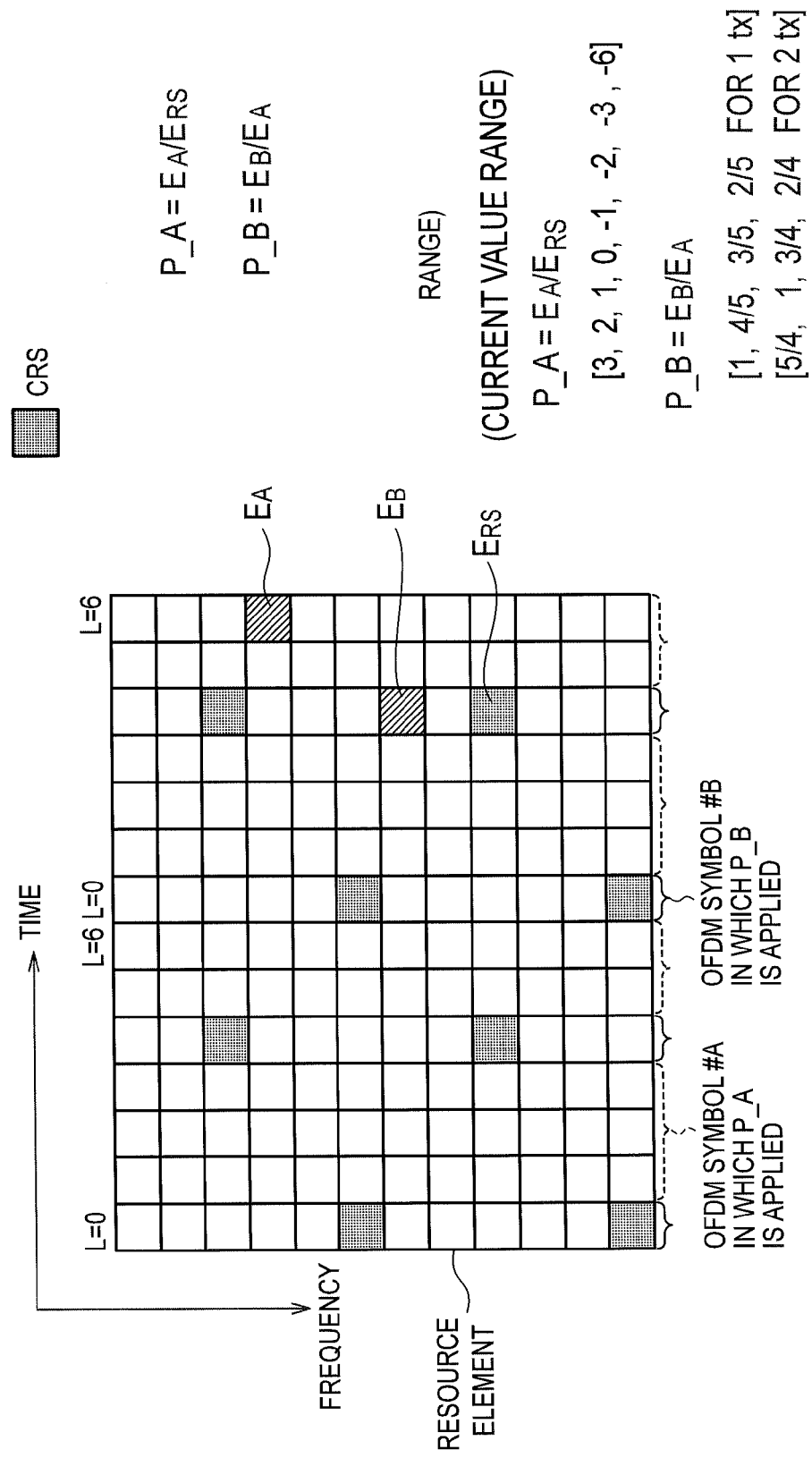
FIG. 3 is a diagram for explaining "P_A" and "P_B" used in the mobile communication system according to the first embodiment of the present invention.

For example, as shown in FIG. 3, the control unit 11 is configured to calculate an ABS "P_A" from "$E_A/E_{RS}$" and to calculate an ABS "P_B" from "$E_B/E_A$".

Here, "$E_A$" represents transmission power on the PDSCH in an OFDM symbol #A in which no CRS is transmitted in ABS, "$E_B$" represents transmission power on the PDSCH in an OFDM symbol #B in which the CRS is transmitted in ABS, and "$E_{RS}$" represents transmission power of the CRS.

More specifically, the ABS "P_A" is a value representing a ratio between the transmission power on the PDSCH in the OFDM symbol #A in which no CRS is transmitted in ABS and the transmission power of the CRS. Meanwhile, the ABS "P_B" is a value representing a ratio between the transmission power on the PDSCH in the OFDM symbol #B in which the CRS is transmitted and the transmission power on the PDSCH in the OFDM symbol #A in which no CRS is transmitted in ABS.

Note that the ABS "P_A" is an offset value individually set for each mobile station, while the ABS "P_B" is an offset value commonly set within a cell.

The transmission unit 12 is configured to transmit various signals to the mobile station UE. Here, the transmission unit 12 is configured to notify the mobile station UE of an ABS pattern, the ABS "P_B" initial value, the ABS "P_A" initial value, the difference information from the ABS "P_A" initial value, the difference information from the ABS "P_B" initial value, and the like.

For example, the transmission unit 12 may be configured to notify the mobile station UE of the ABS pattern and the ABS "P_B" initial value, using notification.

To be more specific, the transmission unit 12 may be configured to make notification of the ABS pattern (see FIG. 5) and the ABS "P_B" initial value with "PDSCH-Config-Common (see FIG. 4)" in "RadioResourceConfigCommon-SIB" in an SIB (System Information Block) 2.

Also, the transmission unit 12 may be configured to notify the mobile station UE of the ABS pattern and the ABS "P_A" initial value by RRC signaling.

To be more specific, the transmission unit 12 may be configured to notify the ABS pattern (see FIG. 5) and the ABS "P_A" initial value, using "PDSCH-ConfigDedicated (see FIG. 4)" in "PhysicalConfigDedicated" in "RadioResourceConfigDedicated" in "RRCConnectionReconfiguration".

Note that the ABS pattern notified of via the notification and the ABS pattern notified of through RRC signaling are the same.

Moreover, the transmission unit 12 may be configured to make notification of the difference information from the "P_B" initial value and the difference information from the "P_A" initial value, using MAC Control Element.

Figure 6:
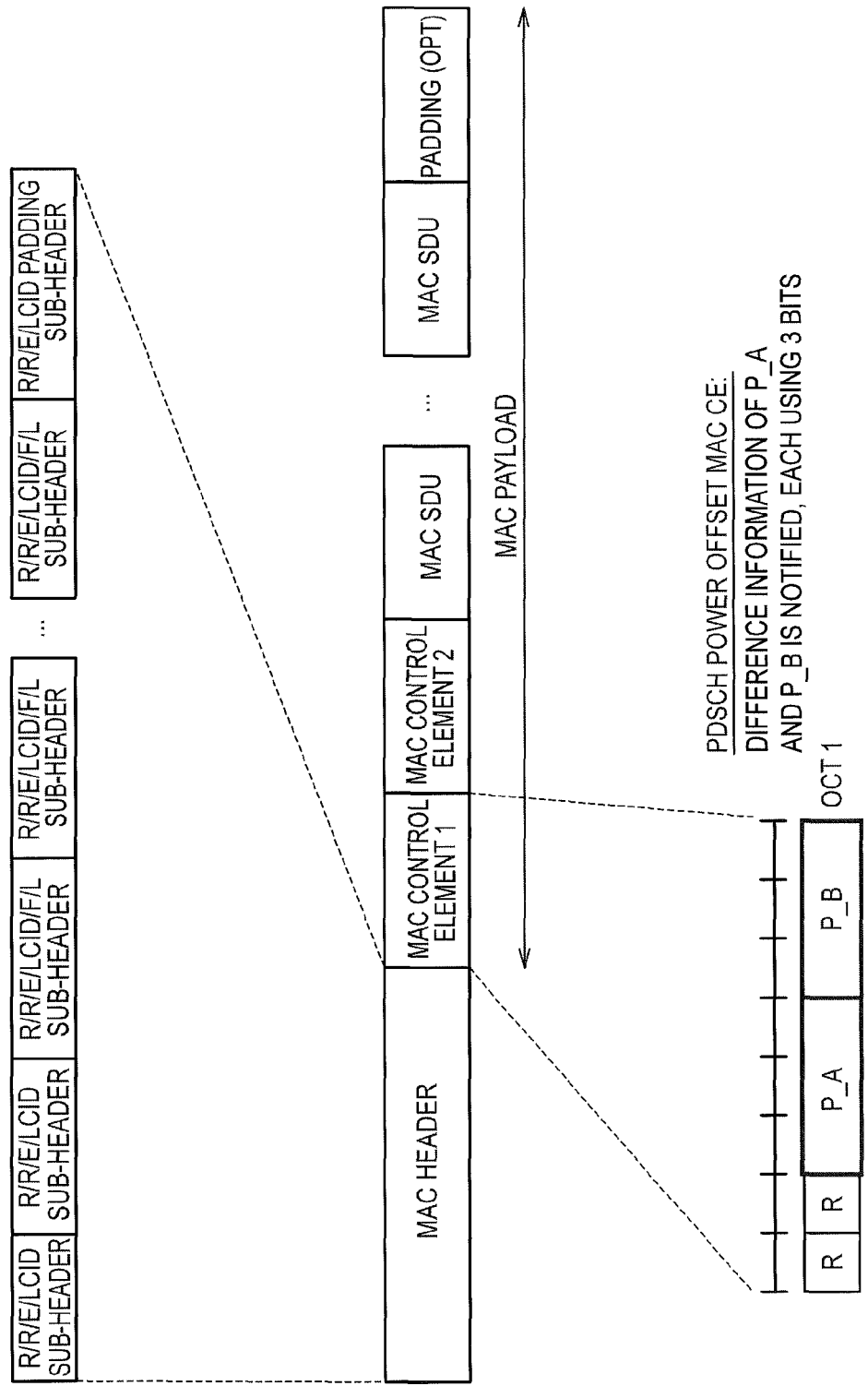
FIG. 6 is a diagram showing an example of MAC Control Element used in the mobile communication system according to the first embodiment of the present invention.

To be more specific, the transmission unit 12 may be configured to make notification of the difference information from the "P_B" initial value and the difference information from the "P_A" initial value by using three bits in MAC Control Element for each difference information, as shown in FIG. 6.

Furthermore, the transmission unit 12 may be configured to acquire the difference information from the ABS "P_B" initial value and the difference information from the ABS "P_A" initial value through the PDCCH.

As shown in FIG. 7, the mobile station UE includes an offset value acquisition unit 21 and a downlink data signal receiving unit 22.

The offset value acquisition unit 21 is configured to acquire the ABS pattern and the ABS "P_B" initial value through the notification, and to acquire the ABS pattern and the ABS "P_A" initial value through the RRC signaling from the radio base station eNB.

To be more specific, the offset value acquisition unit 21 may be configured to acquire the ABS pattern and the ABS "P_B" initial value through the SIB2, and to acquire the ABS pattern and the ABS "P_A" initial value through the "RRCConnectionReconfiguration".

Also, the offset value acquisition unit 21 may be configured to acquire the difference information from the ABS "P_B" initial value and the difference information from the ABS "P_A" initial value through the MAC Control Element.

Alternatively, the offset value acquisition unit 21 may be configured to acquire the difference information from the ABS "P_B" initial value and the difference information from the ABS "P_A" initial value through the PDCCH.

The downlink data signal receiving unit 22 is configured to perform a demodulation process on a downlink data signal in ABS based on the ABS pattern, the ABS "P_B" initial value and the ABS "P_A" initial value.

To be more specific, the downlink data signal receiving unit 22 is configured to calculate a ratio between the CRS transmission power in ABS and the transmission power on the PDSCH based on the ABS "P_B" initial value and the ABS "P_A" initial value, and then perform a demodulation process on the downlink data signal in ABS based on the calculated ratio.

Figure 8:
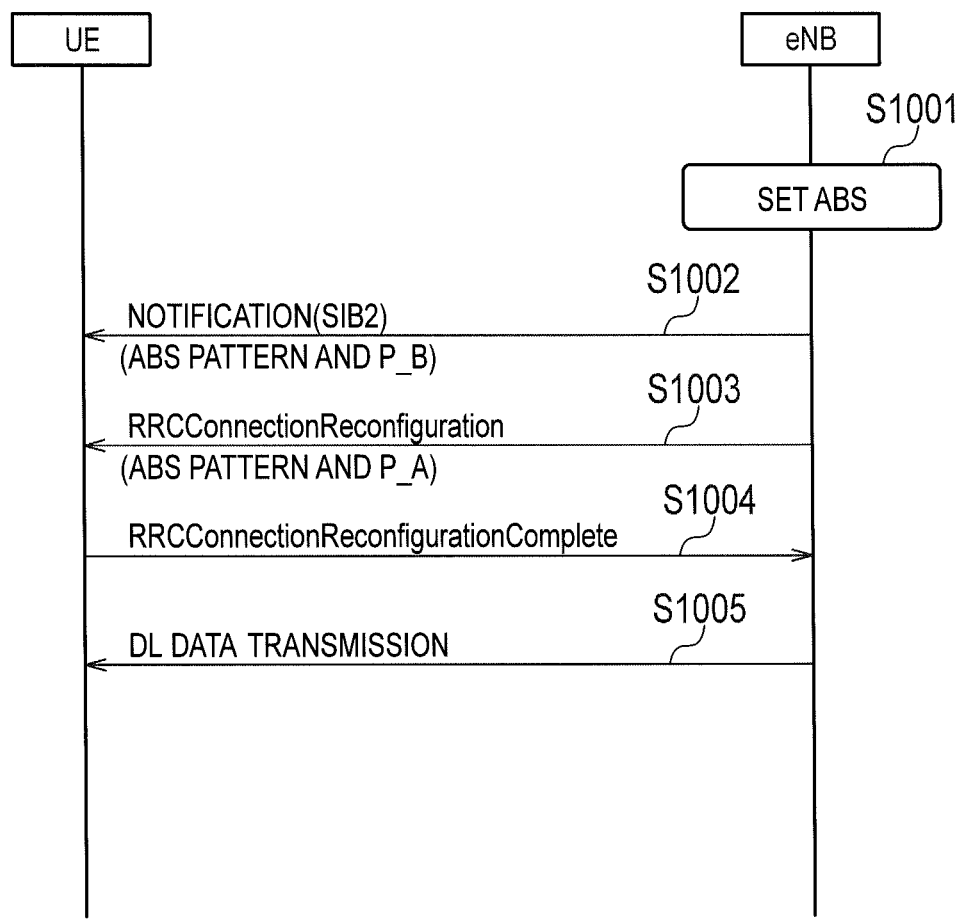
FIG. 8 is a sequence diagram showing operations of the mobile communication system according to the first embodiment of the present invention.
Figure 9:
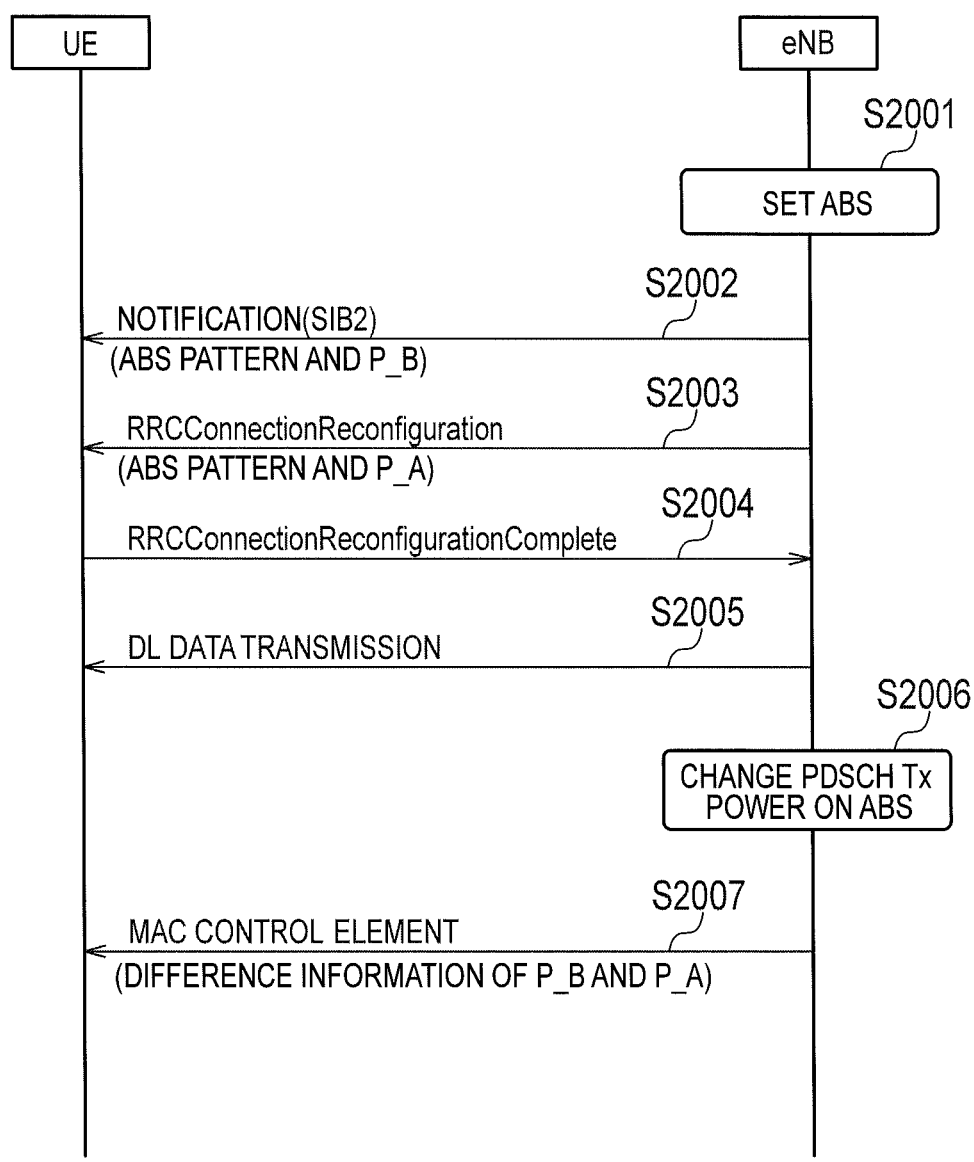
FIG. 9 is a sequence diagram showing operations of the mobile communication system according to the first embodiment of the present invention.
Figure 10:
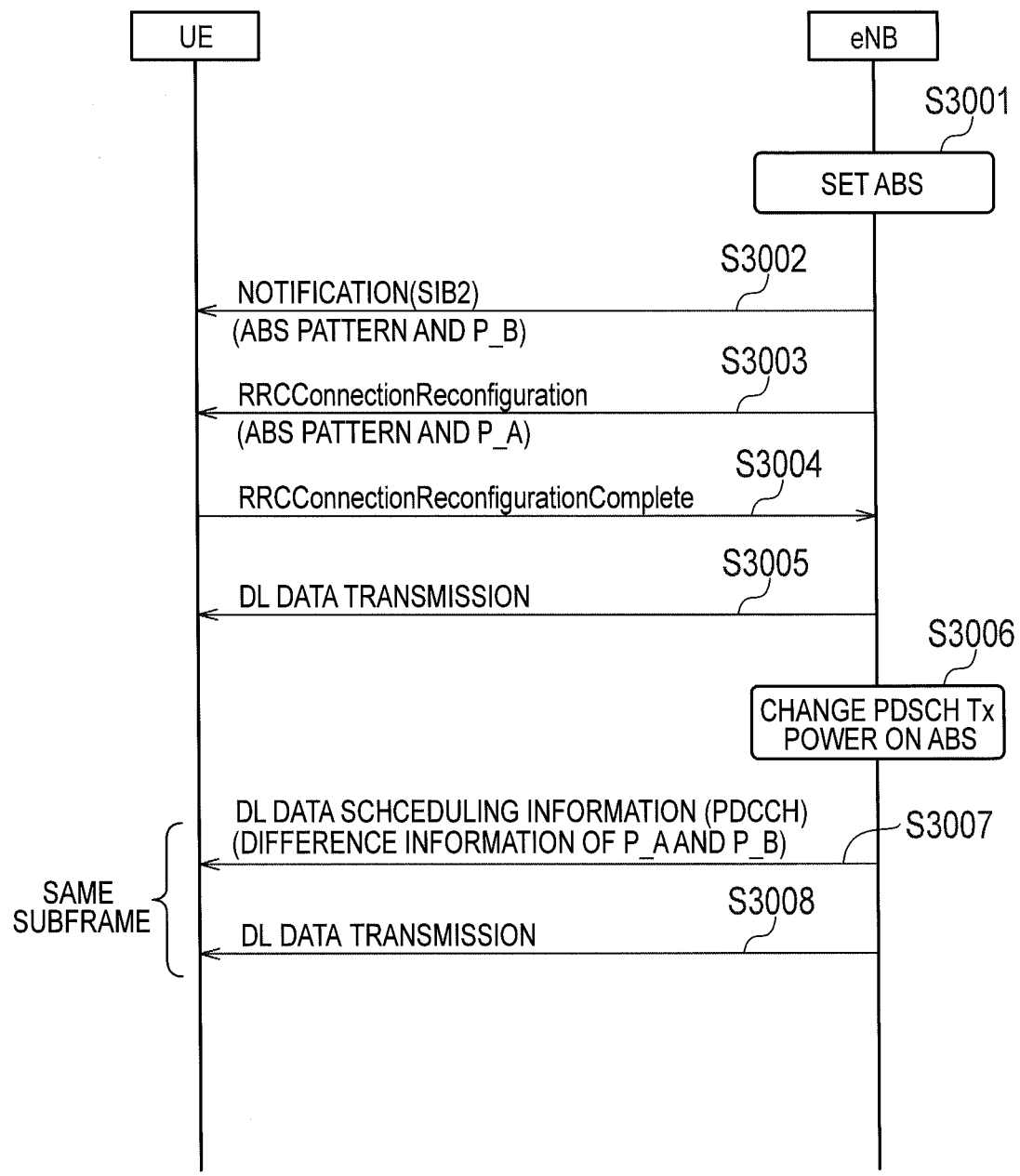
FIG. 10 is a sequence diagram showing operations of the mobile communication system according to the first embodiment of the present invention.
Figure 11:
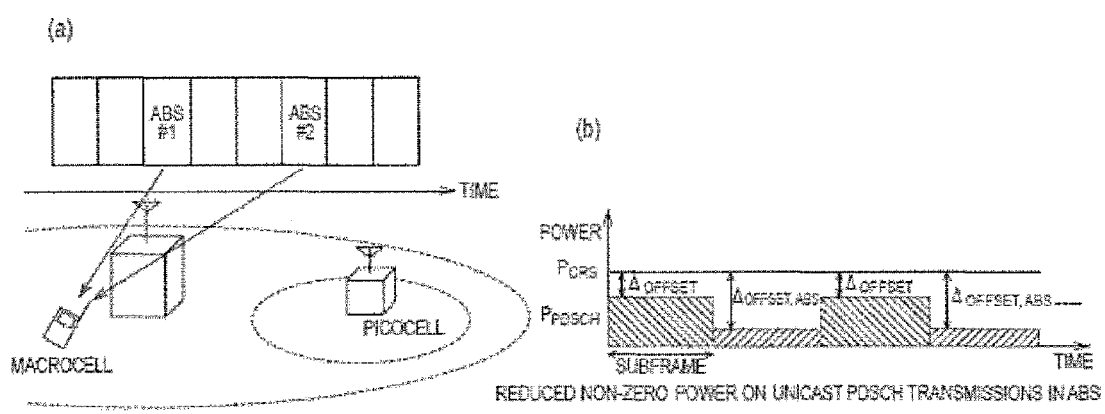
FIG. 11 is a diagram for explaining problems of a conventional mobile communication system.

With reference to FIGS. 8 to 10, operations of the mobile communication system according to this embodiment will be described below.

First, with reference to FIG. 8, Operation Example 1 of the mobile communication system according to this embodiment will be described.

As shown in FIG. 8, the radio base station eNB sets an ABS in a cell under the control thereof in Step S1001, and then notifies the mobile station UE of an ABS pattern and an ABS "P_B" initial value through an SIB2 in Step S1002. The radio base station eNB notifies the mobile station UE of an ABS pattern and an ABS "P_A" initial value through "RRCConnectionReconfiguration" in Step S1003.

In Step S1004, the mobile station UE acquires the ABS pattern, the ABS "P_B" initial value and the ABS "P_A" initial value, and transmits "RRCConnectionReconfigurationComplete" to the radio base station eNB.

Thereafter, in Step S1005, the mobile station UE performs a demodulation process on a downlink data signal in ABS based on the ABS pattern, the ABS "P_B" initial value and the ABS "P_A" initial value.

Secondly, with reference to FIG. 9, Operation Example 2 of the mobile communication system according to this embodiment will be described.

As shown in FIG. 9, operations of Steps S2001 to S2005 are the same as those of Steps S1001 to S1005 shown in FIG. 8.

In Step S2006, the radio base station eNB calculates difference information from the ABS "P_A" initial value and difference information from the ABS "P_B" initial value after determining to change the transmission power on the PDSCH in ABS. Then, in Step S2007, the radio base station eNB notifies the mobile station UE of the calculated difference information from the ABS "P_A" initial value and difference information from the ABS "P_B" initial value through MAC Control Element.

Subsequently, the mobile station UE updates the ABS "P_A" and ABS "P_B" based on the difference information from the ABS "P_A" initial value and the difference information from the ABS "P_B" initial value, and then performs a demodulation process on the downlink data signal in ABS based on the ABS pattern and the updated values of the ABS "P_B" and ABS "PA".

Third, with reference to FIG. 10, Operation Example 3 of the mobile communication system according to this embodiment will be described.

As shown in FIG. 10, operations of Steps S3001 to S3006 are the same as those of Steps S2001 to S2006 shown in FIG. 9.

In Step S3007, the radio base station eNB notifies the mobile station UE of the calculated difference information from the ABS "P_A" initial value and difference information from the ABS "P_B" initial value through the PDCCH. Then, in Step S3008, the radio base station eNB transmits the downlink data signal through the PDSCH in the same subframe as that of the PDCCH.

Subsequently, the mobile station UE updates the ABS "P_A" and ABS "P_B" based on the difference information from the ABS "P_A" initial value and the difference information from the ABS "P_B" initial value, and then performs a demodulation process on the downlink data signal in ABS based on the ABS pattern and the updated values of the ABS "P_B" and ABS "P_A".

The invention according to this embodiment enables the radio base station eNB to notify the mobile station UE of the ABS pattern, the ABS "P_B" initial value, the ABS "P_A" initial value, the difference information from the ABS "P_B" initial value and the difference information from the ABS "P_A" initial value in an appropriate timing using the SIB2, "RRCConnectionReconfiguration" and MAC Control Element (or PDCCH). The invention according to this embodiment also enables the mobile station UE to perform an appropriate demodulation process on the received signal in ABS.

The features of this embodiment described above may be expressed as follows.

A first feature of this embodiment is summarized as a mobile communication method including the steps of: notifying a mobile station UE of an initial value of a "P_B (first offset value)" for ABS by a radio base station eNB using SIB2 (notification); notifying the mobile station UE of an initial value of a "P_A (second offset value)" for ABS by the radio base station eNB through "RRCConnectionReconfiguration (RRC signaling)"; and performing a demodulation process on a downlink data signal in ABS by the mobile station UE based on the initial value of the "P_B" for ABS and the initial value of the "P_A" for ABS, in which the "P_B" for ABS is a value representing a ratio between transmission power on a PDSCH (physical downlink shared channel) in a OFDM symbol (period) #B in which a CRS (cell-specific reference signal) is transmitted in ABS, and transmission power on the PDSCH in a OFDM symbol (period) in which no CRS is transmitted in ABS, and "P_A" for ABS is a value representing a ratio between the transmission power on the PDSCH in the OFDM symbol #A in which no CRS is transmitted in ABS and transmission power of the CRS.

In the first feature of this embodiment, the mobile communication method may include the step of making notification, by the radio base station eNB using MAC Control Element, of difference information from the initial value of the"P_B" for ABS and difference information from the initial value of the "P_A" for ABS.

In the first feature of this embodiment, the mobile communication method may include the step of making notification, by the radio base station eNB through a PDCCH (physical downlink control channel), of difference information from the initial value of the "P_B" for ABS and difference information from the initial value of the "P_A" for ABS.

A second feature of this embodiment is summarized as a radio base station eNB including: a transmission unit 12 configured to notify a mobile station UE of an initial value of a "P_B" for ABS by using SIB2, and to notify the mobile station UE of an initial value of a "P_A" for ABS through "RRCConnectionReconfiguration".

In the second feature of this embodiment, the transmission unit 12 may make notification of difference information from the initial value of the "P_B" for ABS and difference information from the initial value of the "P_A" for ABS by using MAC Control Element.

In the second feature of this embodiment, the transmission unit 12 may make notification of difference information from the initial value of the "P_B" for ABS and difference information from the initial value of the "P_A" for ABS through a PDCCH.

A third feature of this embodiment is summarized as a mobile station UE including: an offset value acquisition unit 21 configured to acquire an initial value of a "P_B" for ABS by using SIB2, and to acquire an initial value of a "P_A" for ABS through "RRCConnectionReconfiguration" from a radio base station eNB; and a downlink data signal receiving unit 22 configured to perform a demodulation process on a downlink data signal in ABS based on the initial value of the "P_B" for ABS and the initial value of the "P_A" for ABS.

In the third feature of this embodiment, the offset value acquisition unit 21 may acquire difference information from the initial value of the "P_B" for ABS and difference information from the initial value of the "P_A" for ABS through MAC Control Element.

In the third feature of this embodiment, the offset value acquisition unit 21 may acquire difference information from the initial value of the "P_B" for ABS and difference information from the initial value of the "P_A" for ABS through a PDCCH.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-017376 (filed on Jan. 30, 2012) is incorporated by reference in the present specification.

INDUSTRIAL APPLICABILITY

As described above, the present invention can provide a mobile communication method, a radio base station and a mobile station, capable of performing an appropriate demodulation process on a received signal in ABS.

EXPLANATION OF THE REFERENCE NUMERALS eNB radio base station
11 control unit
12 transmission unit
UE mobile station
21 offset value acquisition unit
22 downlink data signal receiving unit

The invention claimed is:

1. A mobile communication method comprising the steps of;
    notifying a mobile station of an initial value of a first offset value by a radio base station;
    notifying the mobile station of an initial value of a second offset value by the radio base station; and
    performing a demodulation process on a downlink data signal in an Almost Blank Subframe (ABS) by the mobile station based on the initial value of the first offset value and the initial value of the second offset value, wherein
    the first offset value is a value representing a ratio between transmission power on a physical downlink shared channel in a first period in which a cell-specific reference signal is transmitted in ABS, and transmission power on the physical downlink shared channel in a second period in which no cell-specific reference signal is transmitted in ABS, and
    the second offset value is a value representing a ratio between the transmission power on the physical downlink shared channel in the second period in which no cell-specific reference signal is transmitted in the ABS and transmission power of the cell-specific reference signal.

2. A radio base station comprising:
    a transmission unit configured to notify a mobile station of an initial value of a first offset value, and to notify the mobile station of an initial value of a second offset value, wherein
    the first offset value is a value representing a ratio between transmission power on a physical downlink shared channel in a first period in which a cell-specific reference signal is transmitted in an Almost Blank Subframe (ABS) and transmission power on the physical downlink shared channel in a second period in which no cell-specific reference signal is transmitted in ABS, and
    the second offset value is a value representing a ratio between the transmission power on the physical downlink shared channel in the second period in which no cell-specific reference signal is transmitted in the ABS and transmission power of the cell-specific reference signal.

3. A mobile station comprising:
    an offset value acquisition unit configured to acquire an initial value of a first offset value and to acquire an initial value of a second offset value from a radio base station; and
    a downlink data signal receiving unit configured to perform a demodulation process on a downlink data signal in an Almost Blank Subframe (ABS) based on the initial value of the first offset value and the initial value of the second offset value, wherein
    the first offset value is a value representing a ratio between transmission power on a physical downlink shared channel in a first period in which a cell-specific reference signal is transmitted in ABS and transmission power on the physical downlink shared channel in a second period in which no cell-specific reference signal is transmitted in ABS, and the second offset value is a value representing a ratio between the transmission power on the physical downlink shared channel in the second period in which no cell-specific reference signal is transmitted in the ABS and transmission power of the cell-specific reference signal.

* * * * *